W. HEATHERMON.
HOOF PAD.
APPLICATION FILED JUNE 29, 1908.

918,149.

Patented Apr. 13, 1909.

WITNESSES:
O. R. Erwin
I. D. Bremer

INVENTOR
William Heathermon
By Erwin & Wheeler
ATTORNEYS

UNITED STATES PATENT OFFICE.

WILLIAM HEATHERMON, OF KNEELAND, WISCONSIN.

HOOF-PAD.

No. 918,149.      Specification of Letters Patent.      Patented April 13, 1909.

Application filed June 29, 1908. Serial No. 440,983.

*To all whom it may concern:*

Be it known that I, WILLIAM HEATHERMON, a citizen of the United States, residing at Kneeland, county of Racine, and State of Wisconsin, have invented new and useful Improvements in Hoof-Pads, of which the following is a specification.

My invention relates to improvements in hoof pads, for applying moisture to the hoofs of horses and other animals.

Figure 1:
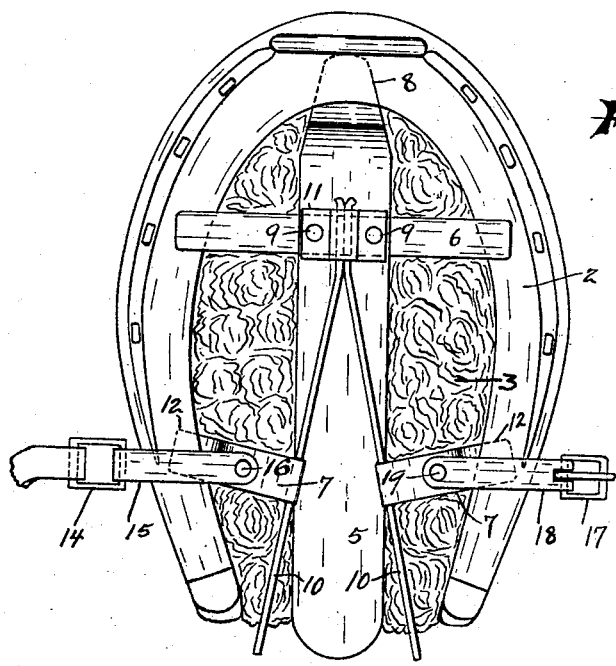
Figure 2:
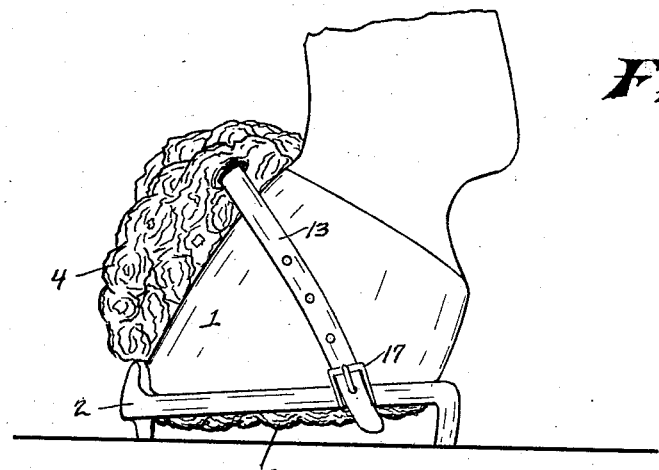

The construction of my invention is further explained by reference to the accompanying drawings in which, Figure 1 represents a bottom view of a horse's hoof, in connection with my pad retaining device. Fig. 2 represents a side view of a horse's hoof, showing the manner of securing a pad to the upper as well as to the lower side of the hoof.

Like parts are identified by the same reference figures in both views.

1 represents a horse's hoof, 2 a shoe of ordinary construction, 3 a pad for retaining moisture against the bottom of the hoof and 4 a pad for retaining moisture against the front or upper part of the hoof. The pads 3 and 4 may be made of sponge, felt or other moisture absorbing material. The lower pad 3 is retained in place by the longitudinal central bar 5, the front transversely arranged bar 6 and the rear transversely arranged bars 7, 7. The front end of the bar 5 is bent upwardly and inserted between the front end of the shoe and the horse's hoof, as indicated by dotted lines at 8, in Fig. 1, while the respective ends of the transversely arranged bar 6 bear against the lower side of the shoe, while the central portion of said bar 6 is rigidly affixed to the longitudinal bar 5 by a plurality of rivets 9, 9. The transversely arranged bars 7, 7, are connected with the central bar 5 by the resilient arms 10, 10, the front end of said arms being rigidly affixed to the front end of the bar 5, by the cap 11 or in any other equivalent manner. The outer ends of the bars 7, 7, are adapted to be inserted beneath the respective sides of the shoe, as indicated by dotted lines at 12, 12.

It will be understood that when desirous to secure the pad 3 in place, the front end of the bar 5 is first inserted between the front end of the shoe and the hoof, when the resilient arms 10, 10, are pressed together, until the outer ends of the bars 7, 7, are brought within the respective sides of the shoe, when said outer ends are pressed upward and inserted between the horse's hoof and the rear portions of the shoe, as stated. When this is done, the resilient arms 10, 10, spring apart, whereby the bars 7, 7, are retained in place. The pad 4 is retained in place upon the upper side of the hoof by the flexible strap 13, and said strap is connected at one end with one of the bars 7, 7, through the loop 14, metallic plate 15 and plate retaining rivet 16, while the opposite end of said strap is connected with the other plate 7, through the buckle 17, metallic plate 18 and rivet 19. Thus it is obvious that when the pad 4 is in place and the strap 13 is drawn firmly around and through it, the tension of the strap 13 will have a tendency to spread the resilient arms 10, 10, and thereby retain the outer ends of said bars 7, 7, more securely in place beneath the respective sides of the shoe. It will, of course, be understood that when desirous to apply a soaking pad to the bottom of the hoof only, the strap 13 and the members by which said strap is connected to the bar 7 may be dispensed with.

Having thus described my invention what I claim as new and desire to secure by Letters Patent is,

1. In a device of the described class, the combination of a moisture retaining pad adapted to be retained against the bottom of the horse's hoof, a longitudinal central member, adapted to be secured at one end between the front end of the shoe and the horse's hoof, a transversely arranged member centrally connected with the front end of said longitudinal central member and adapted to bear at its respective ends against the lower side of the shoe, a pair of resilient arms secured at their front ends to the front ends of said longitudinal member and a pair of laterally extending arms respectively affixed at one end to said resilient arms and adapted to engage at their opposite ends beneath the respective sides of the shoe, substantially as and for the purpose specified.

2. In a device of the described class, the combination of a moisture retaining pad adapted to be retained against the bottom of the horse's hoof, a longitudinal central member, adapted to be secured at one end between the front end of the shoe and the horse's hoof, a transversely arranged member centrally connected with the front end of said longitudinal central member and adapted to bear at its respective ends against the lower side of the shoe, a pair of resilient arms secured at their front ends to the front ends of said longitudinal member, a pair of laterally extending arms respectively affixed at one end to said resilient arms, adapted to engage at their opposite ends beneath the respective sides of the shoe, a pad adapted to be applied to the upper side of a horse's hoof, a flexible member connected with said pad and means for connecting the respective ends of said flexible member with the outer ends of said laterally projecting plates, which are supported from said resilient arms, all substantially as and for the purpose specified.

In testimony whereof I affix my signature in the presence of two witnesses.

WILLIAM HEATHERMON.

Witnesses:
JAS. B. ERWIN,
CHAS. CASPARI.